United States Patent
Rahman et al.

(10) Patent No.: US 9,979,793 B2
(45) Date of Patent: May 22, 2018

(54) METHODS AND SYSTEMS FOR SENDING AND RECEIVING INFORMATION DATA

(71) Applicant: Pismo Labs Technology Limited, Hong Kong (HK)

(72) Inventors: Nusrat Rahman, Hong Kong (HK); Kit Wai Chau, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 614 days.

(21) Appl. No.: 14/349,075

(22) PCT Filed: Jul. 5, 2013

(86) PCT No.: PCT/IB2013/055495
§ 371 (c)(1),
(2) Date: Apr. 2, 2014

(87) PCT Pub. No.: WO2015/001392
PCT Pub. Date: Jan. 8, 2015

(65) Prior Publication Data
US 2015/0222715 A1 Aug. 6, 2015

(51) Int. Cl.
*H04L 12/24* (2006.01)
*H04L 29/08* (2006.01)
*H04L 12/26* (2006.01)

(52) U.S. Cl.
CPC .............. *H04L 67/16* (2013.01); *H04L 43/08* (2013.01); *H04L 43/10* (2013.01); *H04L 43/50* (2013.01);
(Continued)

(58) Field of Classification Search
CPC ......... H04L 67/10; H04L 67/16; H04L 43/10; H04L 43/50; H04L 43/0817;
(Continued)

(56) References Cited

U.S. PATENT DOCUMENTS

| 7,783,784 B1 * | 8/2010 | Droux ................. H04L 41/0803 370/358 |
| 7,873,065 B1 * | 1/2011 | Mukerji ................ H04L 47/365 370/353 |

(Continued)

FOREIGN PATENT DOCUMENTS

| CN | 102204349 A | 9/2011 |
| WO | 2011073707 A1 | 6/2011 |

OTHER PUBLICATIONS

International Search Report in International Application No. PCT/IB2013/055495, dated Jul. 14, 2014.
(Continued)

*Primary Examiner* — Moustafa M Meky
*Assistant Examiner* — Elizabeth Kassa
(74) *Attorney, Agent, or Firm* — Hershkovitz & Associates, PLLC; Abe Hershkovitz

(57) ABSTRACT

A method and system for choosing at least one network interface among a plurality of network interfaces to send and receive information data by determining performance data for a plurality of network interface groups. A network interface group comprises one or more network interfaces of a network device. Performance data of a network interface group is determined by sending testing data through at least one network interface comprised in the network interface group. Performance data may be based on a report received from a test server to which the testing data was sent. Performance data is determined according to one or more performance metrics such as a CPU usage metric, a memory usage metric, a response time metric, a packet delay metric, a packet latency metric, a bandwidth metric, a throughput metric, packet loss, packet drop, a power consumption metric, or a signal to noise ratio (SNR) metric. When performance data is determined according to more than one performance metric, weights are assigned to the more than
(Continued)

one performance metrics. A network interface group with best performance, according to the performance data, is selected. Information data is sent and received through one or more network interfaces comprised in the network interface group selected.

32 Claims, 6 Drawing Sheets

(52) U.S. Cl.
CPC ...... *H04L 43/0817* (2013.01); *H04L 43/0829* (2013.01); *H04L 43/0858* (2013.01); *H04L 43/0864* (2013.01); *H04L 43/0888* (2013.01)

(58) Field of Classification Search
CPC ............. H04L 43/0829; H04L 43/0858; H04L 43/0864; H04L 43/0888
USPC ........................................................ 709/224
See application file for complete search history.

(56) References Cited

U.S. PATENT DOCUMENTS

| | | | |
|---|---|---|---|
| 8,274,893 B2 | 9/2012 | Bansal et al. | |
| 8,805,386 B2* | 8/2014 | Cho | H04L 45/46 370/329 |
| 9,258,216 B2* | 2/2016 | Sung | H04L 45/24 |
| 2003/0177290 A1 | 9/2003 | Ayukawa et al. | |
| 2004/0267959 A1* | 12/2004 | Cochran | H04L 41/0893 709/239 |
| 2008/0071499 A1* | 3/2008 | Armstead | G06F 11/3414 702/182 |
| 2008/0310419 A1* | 12/2008 | Bansal | H04L 45/00 370/395.6 |
| 2009/0010170 A1* | 1/2009 | Pepper | H04L 43/50 370/241 |
| 2010/0097956 A1* | 4/2010 | Tauil | H04W 8/18 370/254 |
| 2010/0278158 A1* | 11/2010 | Lee | H04W 48/20 370/338 |
| 2011/0040874 A1* | 2/2011 | Dugatkin | H04L 41/00 709/224 |
| 2012/0142293 A1* | 6/2012 | Mueck | H04W 48/12 455/130 |
| 2012/0259588 A1* | 10/2012 | Nakazawa | G06F 11/3476 702/186 |
| 2014/0092738 A1* | 4/2014 | Grandhi | H04L 47/52 370/235 |
| 2014/0098685 A1* | 4/2014 | Shattil | H04L 67/327 370/252 |
| 2014/0278738 A1* | 9/2014 | Feit | G06Q 30/0201 705/7.29 |

OTHER PUBLICATIONS

Written opinion of the International Searching Authority in International Application No. PCT/IB2013/055495, dated Jul. 14, 2014.
First Office Action in Chinese Application No. 201380077981, dated Jan. 9, 2018.

\* cited by examiner

METHODS AND SYSTEMS FOR SENDING AND RECEIVING INFORMATION DATA

TECHNICAL FIELD

This disclosure relates in general to the field of computer networks. More particularly, the present invention relates to methods and systems for selecting a network interface group at a network device and for sending and receiving information data through at least one network interface belonging to the selected network interface group of the network device.

SUMMARY OF THE INVENTION

The present invention discloses a method and system to allow selection of network interface(s) of a network device according to performance data that is determined based on specific performance metrics. The performance metrics can be defined by a user, manufacturer, or administrator of the network device. According to one of the embodiments of the present invention, the network interfaces that are not selected are disabled, and information data is not sent and received through them. According to one of the embodiments, the network interfaces that are not selected are not disabled, but they are not used to send and receive information data. According to one of the embodiments, the network interface(s) that are not selected are either electrically disabled or functionally disabled. The method of the present invention allows the network device to automatically select network interface(s) according to the performance offered by the network interface. The network interface(s) not selected are disabled for various reasons, such as to save power, reduce interference, obtain better performance, reduce cost, or the like.

BACKGROUND ART

U.S. Pat. No. 8,274,893 discloses a method and apparatus to select an interface to establish a network connection based on historical information representing performance of previous network connections that the computer has established through the interface. However, U.S. Pat. No. 8,274,893 does not disclose a method to select a group of network interfaces that may comprise more than one network interface. Additionally, it does not teach how to select a network interface group based on performance data that is determined once a user initiates sending and receiving information data at the network device, and is not based on historical information representing the performance of previous network connection.

U.S. Pat. No. 8,274,893 does not teach how to disconnect a network or disable a network interface functionally or electrically. U.S. Pat. No. 8,274,893 only discloses "terminating the first network connection"; however the aforementioned phrase is not described in the description. In any view, terminating a network connection is not equivalent to functionally or electrically disabling network interfaces not belonging to the selected network interface group.

Furthermore, U.S. Pat. No. 8,274,893 does not discuss a method to select a network interface if the performances represented by the historical information of the network interfaces are the same, or almost the same. It also does not teach how to select a plurality of network interfaces instead of just one network interface using historical information.

DISCLOSURE OF INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data etc. may be passed, forwarded, or transmitted via any suitable means including memory sharing, message passing, token passing, network transmission, etc.

System:

FIG. 1A is an illustrative block diagram of a network device 101 according to one of the embodiments. Network device 101 comprises network interfaces 102, 103 and 108, processing unit 104, main memory 106, secondary storage 105, and system bus 107. Processing unit 104 and main memory 106 are connected to each other directly. System bus 107 connects processing unit 104 directly or indirectly to secondary storage 105, network interface 102, network interface 103, and network interface 108. Using system bus 107 allows network device 101 to have increased modularity. System bus 107 couples processing unit 104 to secondary storage 105, network interface 102, network interface 103, network interface 108. System bus 107 can be any of several types of bus structures including a memory bus, a peripheral bus, and a local bus using any of a variety of bus architectures. Secondary storage 107 stores program instructions for execution by processing unit 104. Secondary storage 105 further stores data comprising performance data that is determined by processing unit 104 according to one or more performance metrics. The data further comprises a list of network interface groups, performance data, and testing data sent and received to determine performance data of a network interface group. The one or more performance metrics to be taken into consideration are stored in secondary storage 105, and retrieved by processing unit 104 while determining the performance data.

The scope of the embodiment is not limited to network device 101 having only three network interfaces 102, 103 and 108. Network device 101 comprises at least two network interfaces, and at least one of the at least two network interfaces is capable of connecting to a wireless access network.

A network interface group is a group comprising one or more network interfaces that are available in a network device. A same network interface may be comprises in more than one network interface group. For example, network device 101 comprises three network interfaces 102, 103 and 108. A first network interface group comprises network interfaces 102 and 103. A second network interface group comprises network interfaces 102, 103 and 108. A third network interface group comprises network interface 108. Selecting network interface group one is equivalent to selecting network interfaces 102 and 103 to send and receive information data. In one of the embodiments, processing unit 104 decides to send and receive information data through at least one of the network interfaces comprised in the network interface group selected.

FIG. 1B illustrates a network environment according to one of the embodiments of the present invention. Network device 101 is connected to Internet 110 through one or more of communication link 102a via network interface 102, communication link 103a via network interface 103, and communication link 108a via network interface 108. Network device 101 selects a network interface group comprising one or more network interfaces that are available in network device 101. In order to select a network interface group, network device 101 sends testing data using network interface(s) comprised in a network interface group being tested via internet 110 to at least one of the two test servers 111 and 112 through communication links 111a and 112a respectively. Test servers 111 and 112 generate performance data after receiving testing data from network device 101 and send the performance data to network device 101 via internet 110 and at least one of the network interfaces 102 through communication link 102a, 103 through communication link 103a and 108 through communication link 108a. The performance data is based on in part one or more performance metrics. The performance metrics may be stored in a storage unit of network device 101 or can be received by network device 101 from one of the test servers 111 and 112. The method of determining performance data and selecting a network interface group based on the performance data is explained in more detail in further embodiments of the invention.

Method:

FIG. 2 illustrates a process selecting a network interface group at a network device, such as network device 101, to send and receive information data according to one of the embodiments of the present invention. In step 201, processing unit 104 determines network interface(s) belonging to network interface groups by retrieving network interface group information from secondary storage 105. The network interface group information can be specified by a user, manufacturer or administrator of network device 101.

In step 202, performance data of each network interface group is determined according to corresponding performance metrics. For example, the performance metric is a latency metric. Then, the performance data is the latency value of one or more access networks that network interfaces comprised in a network interface group are connected to. Alternatively, if the performance metric is a throughput metric, performance data is the throughput value of one or more access networks that network interfaces comprised in a network interface group are connected to. The performance data can be used to indicate which network interface group has the best performance.

The choice of performance metric(s) can be specified by a user, manufacturer or administrator of network device 101. Alternatively, the choice of performance metric(s) can be determined by processing unit 104 according to program instructions stored at secondary storage 105.

In step 203, a network interface group with the best performance is selected by processing unit 104. The network interface group is selected based on the performance data. For example, when the performance metric is a latency metric, the network interface group with lowest latency is considered to have the best performance. Alternatively, when the performance metric is a throughput metric, the network interface group that has the highest throughput is considered to have the best performance. Alternatively, when the performance data is determined according to more than one performance metric, the process of FIG. 4 is carried out in order to select a network interface group.

In step 204, information data is sent and received via at least one of the network interfaces comprised in the network interface group selected. In a preferred embodiment, when a network interface group is selected, network device 101 allows sending and receiving of information data only via network interfaces comprised in the network interface group selected, and does not allow sending and receiving of information data via network interfaces that am not comprised in the network interface group selected.

In one of the embodiments of the present invention, when a network interface group is selected, network interfaces that are not composed in the selected network interface group are functionally or electrically disabled. For example, a first network interface group comprises network interfaces 102 and 103, and a second network interface group comprises network interfaces 102 and 108. In step 203, the first network interface group is selected. Then, network interface 108 is functionally or electrically disabled because it is not comprised in the first network interface group.

Disabling a Network Interface:

In one of the embodiments, a network interface is functionally disabled by not sending and receiving information data via the network interface, but allowing the network interface to draw power from the network device. This allows the network interface to become capable of being used for sending and receiving information data in a short period of time without initializing the network interface.

In one of the embodiments, a network interface is functionally disabled by not sending and receiving information data via the network interface, but maintaining a network connection to an access network, via the network interface. This allows the network interface to be capable of being used for sending and receiving information data in a short period of time without initializing the network interface and corresponding communication link.

In one of the embodiments, a network interface is functionally disabled by using only data link layer in Open Systems Interconnection (OSI) model of the network accessible through the network interface to send and receive data link layer data to maintain a connection with the corresponding communication link.

In one of the embodiments, a network interface is electrically disabled by not allowing the network interface to draw power from the network device. This allows saving of power and reducing interference.

Performance Data:

Performance data of a network interface group is a value describing performance of network interfaces comprised in the network interface group. The performance data is determined according to at least one performance metric.

According to one of the embodiments of the present invention, if difference between performance data of a first network interface group and performance data of a second interface group is within a predetermined range, the performance data of the first network interface group and the performance data of the second network interface group are considered to be the same.

If the performance data of the first network interface group and the performance data of the second network interface group are the same or considered to be the same, a network interface group is selected at random, according to one of the embodiments.

According to one of the embodiments, if the performance data of the first network interface group and the performance data of the second network interface group are the same or considered to be the same, a network interface group is selected according to a predefined setting, which is defined by a user, manufacturer or administrator of the network device. For example, the predefined setting may be to select a network interface group with lower usage pricing, or higher bandwidth cap, etc. It would be apparent to those skilled in the art that there are many factors on which the predefined setting can be based on.

According to one of the embodiments of the present invention, if all network interfaces comprised in the first network interface group are connected to a first wireless network, all network interfaces comprised in the second network interface group are connected to a second wireless network, and the performance data of the first network interface group and the performance data of the second network interface group are the same or considered to be the same, a network interface group is selected according to wireless channel usage of the network interfaces. If a wireless channel is being used by more than one network interface comprised in a network interface group, the wireless channel can be called a common channel. The number of common channels in the first network interface group is recorded. The number of common channels in the second network interface group is also recorded. The network interface group with lowest number of common channels is selected. Network interfaces not comprised in the network interface group with lowest number of common channels is functionally or electrically disabled. The motivation for selecting a network interface group based on wireless channel usage is that if number of common channels is lower, performance can be better due to reduced interference.

In one variant, the wireless network is a licensed wireless spectrum using LTE, 3G, or any other wireless technologies that operate on licensed wireless spectrums. In one variant, the wireless network is an unlicensed wireless spectrum using Wi-Fi, Bluetooth, or any other wireless technologies that operate on unlicensed wireless spectrums.

Testing Data:

Testing data is used to test performance of a network interface in order to determine the performance data. It comprises testing packets, frames or datagrams. According to one of the embodiments of the present invention, testing packets are OSI layer two packets with Point-to-point Protocol (PPP), frame relay protocol. Address Resolution Protocol (ARP), or any other data link layer protocol. According to one of the embodiments of the present invention, testing packets are Internet Protocol (IP) packets with transmission control protocol (TCP), user datagram protocol (UDP), or Internet Control Message Protocol (ICMP). If the network interface connects to an LTE network, testing data comprises Type 1 or Type 2 LTE frames. According to one of the embodiments of the present invention, testing frames are Ethernet frames. The format of the testing data depends on a network protocol based on which the performance data of the network interface group is determined.

Information Data:

Information data is used to carry information. Information data comprises of information packets, frames or datagrams. According to one of the embodiments of the present invention, information packets are IP packets with TCP, a UDP or ICMP. According to one of the embodiments of the present invention, information frames are Ethernet frames. According to one of the embodiments of the present invention, information packets are OSI layer two packets with Point-to-point Protocol (PPP), frame relay protocol, Address Resolution Protocol (ARP), or any other data link layer protocol.

Performance Metric:

Performance data can be measured by processing unit 104 based on performance metrics, corresponding to any of the following layers; physical layer, data-link layer, network layer, transport layer, presentation layer and application layer of the Open Systems Interconnection (OSI) model or link layer, Internet layer, transport layer and application layer of the Internet protocol suite. For example, signal-to-noise ratio (SNR) is a network performance metric that is a property of physical layer (Layer-1) of the OSI model. Whereas, video streaming is a network performance metric that is a property of the application layer. Those skilled in the art would appreciate that different techniques can be deployed to measure performance data based on different performance metrics. The performance metrics may be stored in secondary storage 105 according to one of the embodiments.

In one of the embodiments, performance metrics includes at least one of the following: CPU usage metric, a memory usage metric, a response time metric, a packet delay metric, a packet latency metric, a bandwidth metric, a throughput metric, packet loss, packet drop, a power consumption metric, and a SNR metric. For example, if the performance metric is the CPU usage metric, performance data of a first network interface group, comprising of network interfaces 102 and 103, is measured by sending testing data through network interfaces 102 and/or 103 and measuring a usage percentage of processing unit 104 when testing data is being sent through network interfaces 102 and/or 103.

Performance data can be measured according to performance metric(s) by processing unit 104, of network device 101, by various methods including file transfer, download or upload of data, etc. It would be apparent to those skilled in the art that there are different methods of measuring performance data according to different performance metrics. For example, bandwidth of an access network can be measured by using software that attempts to download or upload maximum amount of data the access network is capable of uploading or downloading in a certain period of time. The scope of the invention is not limited to using methods of measuring performance data discussed herein.

In one of the embodiments, the performance data is measured based on, at least in part, two or more of a weighted CPU usage metric, a weighted memory usage metric, a weighted response time metric, a weighted delay metric, a weighted latency metric, a weighted bandwidth metric, a weighted throughput metric, weighted data loss, at weighted power consumption metric, and a weighted SNR metric.

A network interface, such as network interfaces 102,103 and 108 can be an Ethernet interface, a frame relay interface, a fiber optic interface, a cable interface, a DSL interface, a token ring interface, a serial bus interface, a Universal Serial Bus (USB) interface, Firewire interface, Peripheral Component Interconnect (PCI) interface, or any other interface that is able to connect network device 101 with another network device. A network interface can also be an add-on card, an external modem, etc.

A network interface may be implemented by a standalone electronic component or may be integrated with other electronic components. A network interface may have no network connection or at least one network connection depending on the configuration.

A network interface of a network device can be manually enabled or manually disabled by configuring the network device through an access network and/or a communication port. For example, the network device is connected to a computing device or a mobile communications device using an interface such as a console port, a serial port, a parallel port, an infra-red communications interface, and configuring the network device through a web-interface, computer software, a mobile application, or any configuration interface depending on the network device being configured.

In one of the embodiments of the present invention, at least one of the network interfaces comprised in network device 101 is capable of connecting to at least one wireless access network. In one of the embodiments of the present invention, the at least one wireless access network operates in accordance with a standard selected from a group consisting of Ultra Wideband (UWB), and Worldwide Interoperability for Microwave Access (WiMAX). 3GPP standard. Long Term Evolution (LTE) standard, and 802.11x standard.

In one of the embodiments of the present invention, at least two network interfaces of each network interface group connect to a same wireless access network via a same base station. In one of the embodiments of the present invention, at least one network interface of one of the network interface groups and at least one network interface of another one of the network interface groups use the same radio spectrum.

Determining Performance Data:

FIG. 3 illustrates a process of determining performance data of a network interface group according to one of the embodiments of the present invention. In step 301, processing unit 104 retrieves one or more performance metrics from main memory 106 or secondary storage 105. In one of the embodiments, when mom than one performance metrics are retrieved, weights assigned to the more than one performance medics are also retrieved from main memory 106 or secondary storage 105. If there are no weights assigned to the more than one performance metrics, processing unit 104 assigns equal weight to each of the more than one performance metrics by default. In step 302, processing unit 104 sends testing data through each network interface comprised in the network interface group according to corresponding performance metrics retrieved. Testing data can be sent through the network interfaces sequentially, one-by-one, in a group, simultaneously, or almost simultaneously.

In step 303, performance data of each network interface group is determined by processing unit 104 according to the corresponding performance metrics. In step 304, the performance data is recorded and stored in secondary storage 105. In one of the embodiments, in step 303, processing unit 104 determines performance data based on a performance report received from a test server. To receive the performance report from the test server, processing unit sends testing data to the test server in step 302 through each network interface comprised in the network interface group.

When performance data of a network interface group is measured according to a performance metric, individual performance data of each network interface comprised in the network interface group are measured according to the performance metric. Various algorithms can be applied to determine performance data of the network interface group using the individual performance data.

For example, if performance data is determined according to a bandwidth metric, individual bandwidth offered by each network interface comprised in the network interface group is measured. It would be known to those skilled in the art that there are several methods to determine overall bandwidth of network interface group. According to one of the embodiments, performance data is the overall bandwidth, which is the sum of the individual bandwidths. Performance data of the network interface group is the overall bandwidth offered by the network interfaces comprised in the network interface group. According to one of the embodiments, performance data is the bandwidth variance. According to one of the embodiments, performance data is the average bandwidth.

It would be apparent to those skilled in the art that algorithm(s) applied depends on the performance metric according to which performance data of the network interface group is being determined.

In one of the embodiments of the present invention, when performance data of one of the network interface groups is being determined according to the process of FIG. 3, network interfaces that are not comprised in the one of the network interface groups are functionally or electrically disabled. One of the reasons why the network interfaces are disabled is to reduce interference while performance data is being measured and recorded.

Performance Data According to More than One Performance Metric:

In one of the embodiments, when performance data is determined according to more than one performance metrics, weights are assigned to each performance metric and a weighted score of performance metric is calculated based on weights assigned to each performance metric. FIG. 4 illustrates a process of selecting a network interface group by determining performance data of each network interface group according to more than one performance metric. FIG. 4 is viewed in conjunction with FIG. 1A for a better understanding of the embodiment. For example, performance data is being determined according to two weighted performance metrics.

In step 401, processing unit 104 determines performance data of each network interface group according to a first performance metric, and the performance data is stored in secondary storage 105. Then, in step 403, processing unit 104 determines which network interface group has the best performance as indicated by the performance data determined according to the first performance metric.

Independently, in step 402, processing unit 104 determines performance data of each network interface group according to a second performance metric, and the performance data is stored in secondary storage 105. In step 404, processing unit 104 determines which network interface group has the best performance as indicated by the performance data determined according to the second performance metric.

For example, a first network interface group has the best performance according to the first performance metric, and a second network interface group has the best performance according to the second performance metric.

Step 401 and step 402 are independent of each other. In one of the embodiments, step 402 and 404 are conducted after step 401 and 403 are conducted. In one of the embodiments, step 402 and 404 are conducted before step 401 and 403. In one of the embodiments, step 401 and 402 are conducted first, and then step 403 and 404 are conducted. In one of the embodiments, step 401 and 402 are conducted in parallel, and then step 403 and 404 are conducted in parallel.

In step 405, processing unit 104 determines which of the two performance metrics has a higher weight. If the first performance metric has a higher weight step 406 is conducted and the first network interface group is selected. If the second performance metric has a higher weight, step 407 is conducted and the second network interface group is selected.

Step 401 and step 402 is conducted sequentially for each of the network interface groups. For example, network device 101 has two network interface groups. A first network interface group comprises network interface 102 and network interface 103. A second network interface group comprises network interface 102 and network interface 108. Step 401 and step 402 are first conducted for the first network interface group, and step 401 and step 402 are conducted for the second network interface group after they are conducted for the first network interface group. The order of conducting step 401 for the first network interface group and the second network interface group can be reversed, but step 401 and step 402 cannot be conducted for both the first network interface group and the second network interface group simultaneously.

In one of the embodiments of the present invention, network interface 102 and 103 are connected to a same wireless network. Network interface 102 connects to die wireless network through, a first wireless modem. Network interlace 103 connects to the wireless network through a second wireless modem. FIG. 5 illustrates the selection of network interface(s) based on wireless channel usage of the network interfaces. In step 501, network device 101 allows sending and receiving testing data through both network interface 102 and 103. In step 502, the first wireless modem reports which channels are being used by network interface 102. In step 503, the second wireless modem reports which channels are being used by network interface 103. In step 504, processing unit 104 determines if there are any channels that are being used by both network interfaces 102 and 103. If there are no channels that are being used by both network interfaces 102 and 103, in step 506, processing unit 104 allows sending and receiving of information data via both network interfaces 102 and 103. If there are any channels that are being used by both network interfaces 102 and 103, in step 506, processing unit 104 functionally or electrically disables one of network interfaces in step 505 at random, or according to a predefined setting, such as usage pricing, bandwidth cap, etc. In step 507, processing unit 104 selects another one of the network interfaces and allows sending and receiving of information data via the another one of the network interfaces that has not been functionally or electrically disabled in step 508. According to one of the embodiments, one of the reasons why processing unit 104 functionally or electrically disables one of network interfaces in step 505, is to reduce interference.

In one variant, the wireless network is a licensed wireless spectrum using LTE, 3G, or any other wireless technologies that operate on licensed wireless spectrums. In one variant, the wireless network is an unlicensed wireless spectrum using Wi-Fi, Bluetooth, or any other wireless technologies that operate on unlicensed wireless spectrums.

Figure 1A:
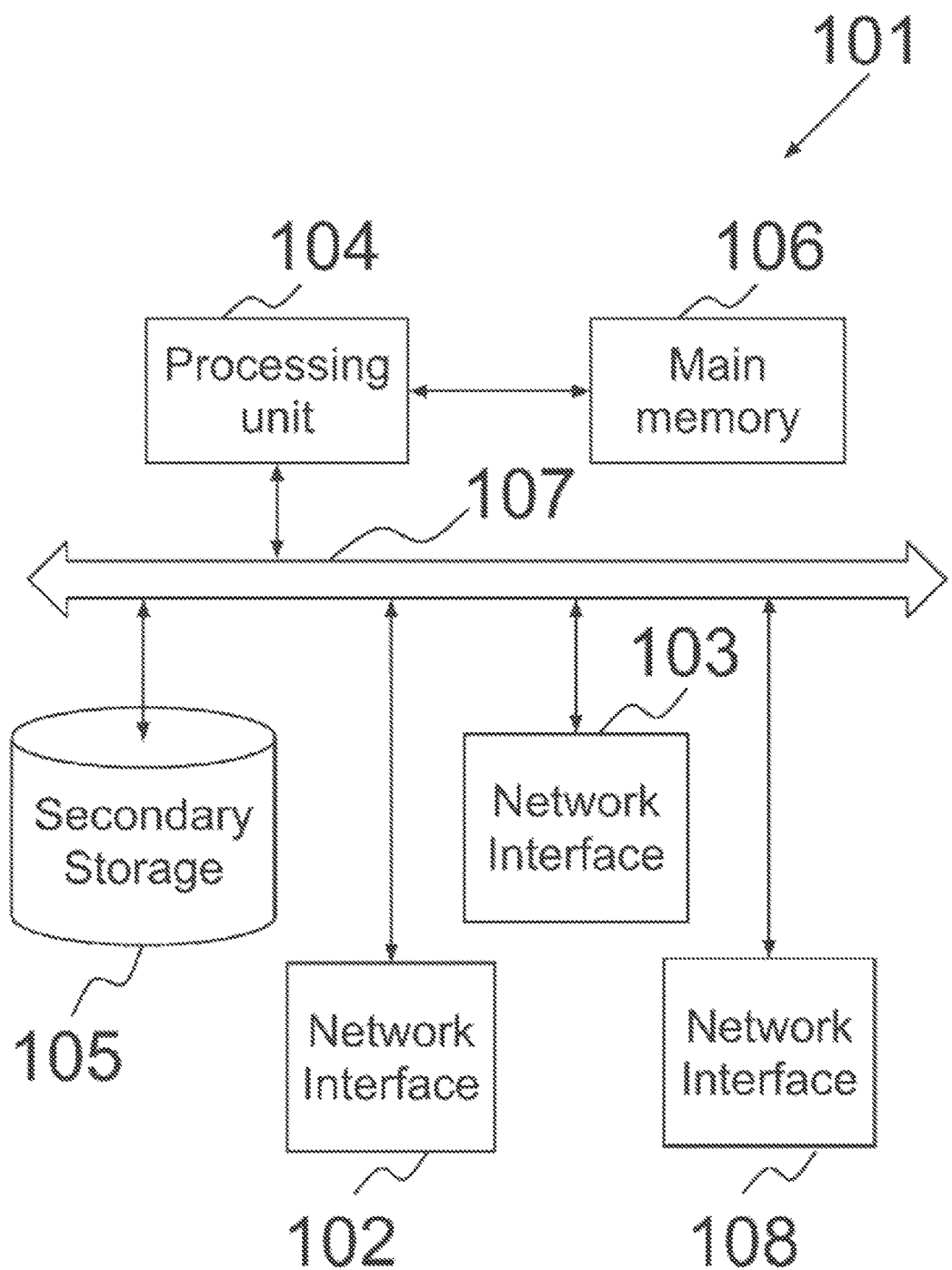
FIG. 1A is an illustrative block diagram of a network device according to one of the embodiments.
Figure 1B:
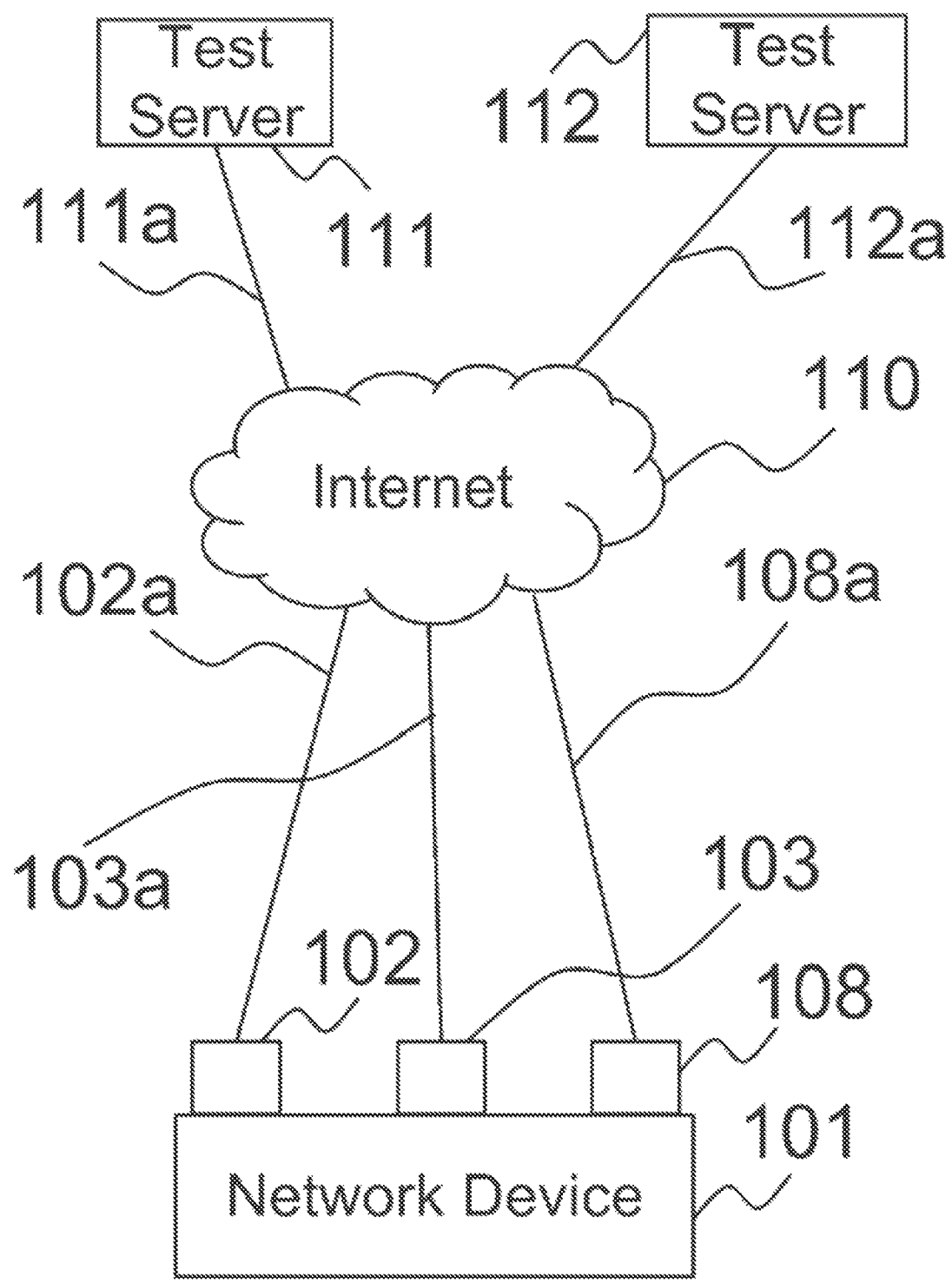
FIG. 1B illustrates a network environment according to one of the embodiments of the present invention.
Figure 2:
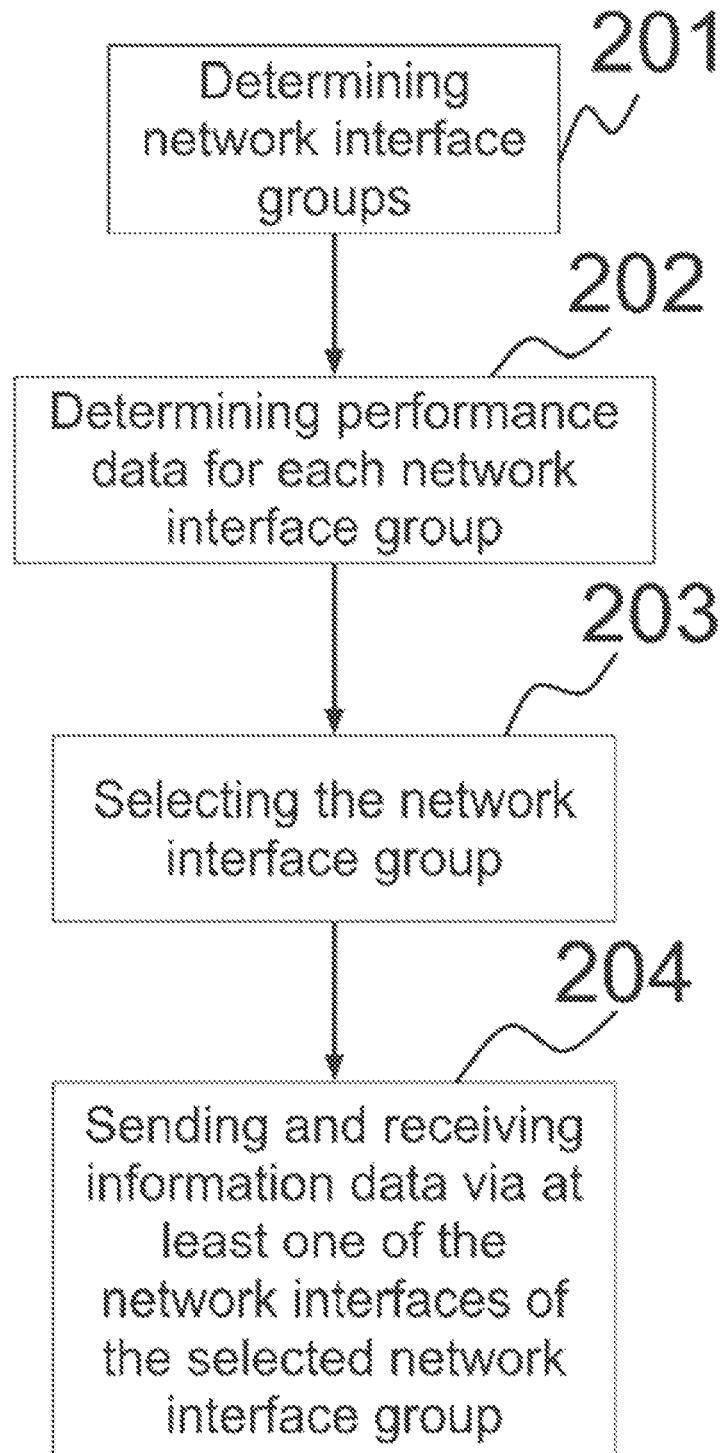
FIG. 2 illustrates a process of sending and receiving information data according to one of the embodiments of the present invention.
Figure 3:
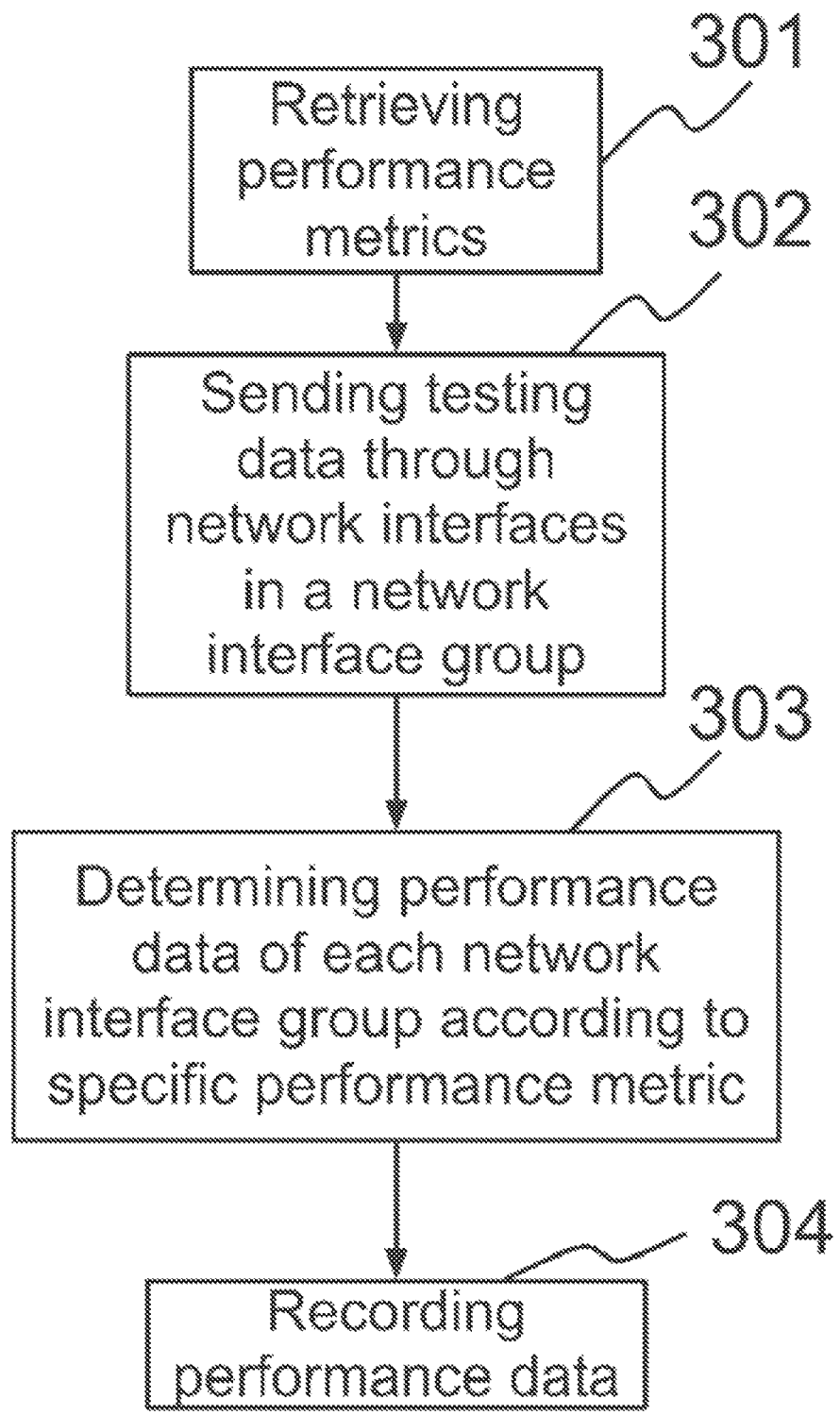
FIG. 3 illustrates a process of determining performance data of a network interface group according to one of the embodiments of the present invention.
Figure 4:
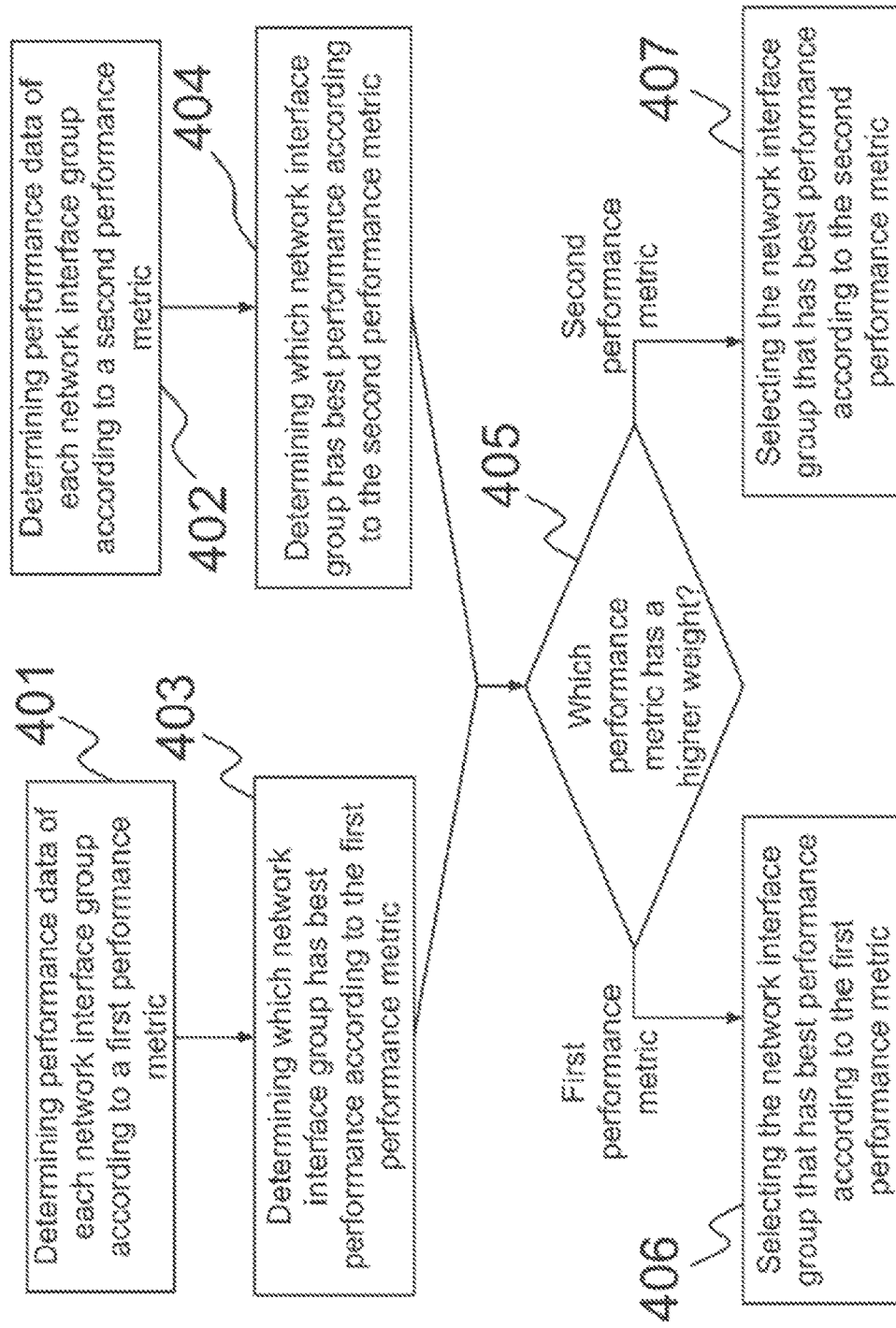
FIG. 4 illustrates a process of selecting a network interface group according to one of the embodiments of the present invention.
Figure 5:
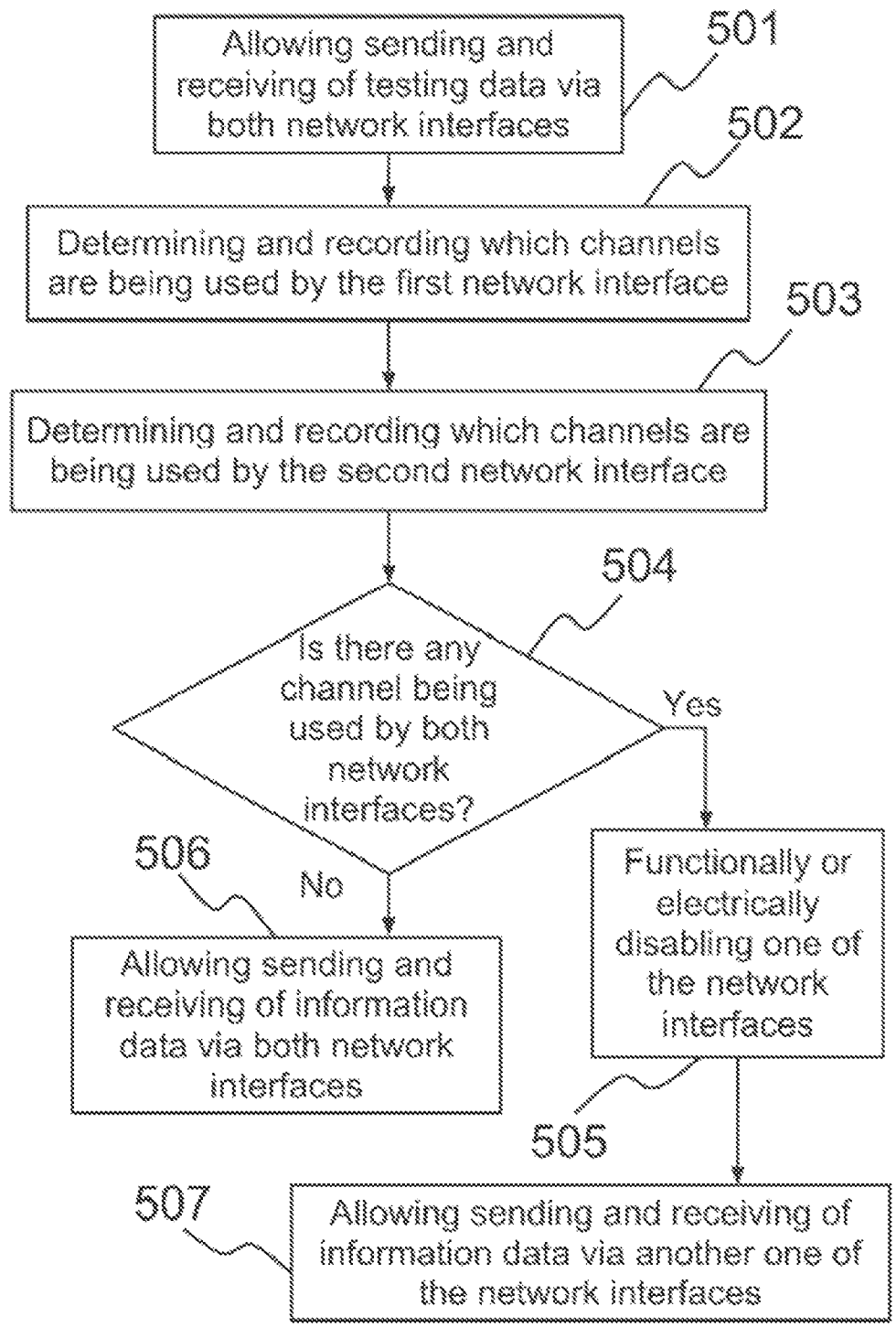
FIG. 5 illustrates the selection of network interface(s) based on wireless channel usage of the network interfaces.

The invention claimed is:

1. A method for sending and receiving information data at a network device, wherein the network device includes a plurality of network interfaces, the method comprising:
   (a) sending testing data using a plurality of network interface groups to test servers;
   (b) determining a performance data for the plurality of network interface groups according to at least one performance metric based on a performance report received from the test servers, wherein each of the plurality of network interface groups includes at least one network interface, wherein the performance data is for selecting a first network interface group automatically
   (c) assigning weights to performance metrics when there are more than one performance metrics;
   (d) calculating a weighted score of performance metrics based on weights assigned to each performance metric, wherein the weighted score is utilized for determining the performance data, wherein the performance data of a network interface group is a combination of performance data of each network interface belonging to the network interface group;
   (e) storing data in a computer readable storage medium, wherein the data comprises the performance data, a list of network interface groups, and the testing data;
   (f) selecting a first network interface group automatically for sending and receiving information data according to the performance data determined;
   (g) when the performance data of the plurality of network interface groups are the same or considered to be the same, a network interface group with the lowest number of common wireless channels is selected as the first network interface group;
   (h) selecting at least one network interface of the first network interface group based on usage of wireless channels;

(i) when more than one network interface uses a wireless channel, selecting a first network interface of the more than one network interface and disabling the rest of the more than one network interface, wherein the first network interface is determined according to a predefined setting;

(j) when no wireless channel is used by more than one network interface, all network interfaces of the first network interface group are selected in step (h);

(k) sending and receiving information data via at least one of the network interfaces of the first network interface group; and wherein at least one network interface of the plurality of network interfaces is configured to connect to a wireless access network.

2. The method according to claim 1, wherein network interface(s) not belonging to the first network interface group is/are disabled after the first network interface group is selected.

3. The method according to claim 1, wherein network interface(s) not belonging to the first network interface group is/are not used to send and receive information data after the first network interface group is selected.

4. The method according to claim 1, wherein when determining the performance data of one of the plurality of network interface groups, network interface(s) not belonging to the one of the plurality of network interface groups is disabled.

5. The method according to claim 1, wherein when determining the performance data of one of the plurality of network interface groups, network interface(s) not belonging to the one of the plurality of network interface groups is not used to send or receive information data.

6. The method according to claim 1, wherein when determining the performance data of one of the plurality of network interface groups, network interface(s) belonging to the one of the plurality of network interface groups is/are used to send or receive testing data and network interface(s) not belonging to the one of the plurality of network interface groups is/are functionally disabled, electrically disabled or not used to send or receive testing data, wherein when a network interface is functionally disabled, the network interface is not allowed to send or receive information data, and the network interface is allowed to draw power from the network device.

7. The method according to claim 1, wherein the at least one performance metric is based in part on at least one of a CPU usage metric, a memory usage metric, a response time metric, a packet delay metric, a packet latency metric, a bandwidth metric, a throughput metric, packet loss, packet drop, a power consumption metric, and a signal to noise ratio (SNR) metric.

8. The method according to claim 1, wherein the at least one performance metric is based in part on at least two of a weighted CPU usage metric, a weighted memory usage metric, a weighted response time metric, a weighted delay metric, a weighted latency metric, a weighted bandwidth metric, a weighted throughput metric, weighted data loss, a weighted power consumption metric, and a weighted signal to noise ratio (SNR) metric.

9. The method according to claim 1, wherein:
the performance data determined is used to indicate the network interface group with best performance; and
the first network interface group is a network interface group with the best performance among the plurality of network interface groups.

10. The method according to claim 9, wherein when at least two performance data are within a predetermined range, the at least two performance data are considered to be the same.

11. The method according to claim 9, wherein when at least two network interface groups have the same performance data, the network interface group for sending and receiving information data is selected randomly.

12. The method according to claim 9, wherein when at least two network interface groups have the same performance data, the network interface group for sending and receiving information data is selected according to a predetermined setting.

13. The method according to claim 9, wherein when performance data is determined according to more than one performance metric, performance data of each network interface group is used to indicate the network interface group with the best performance according to each of the more than one performance metric;
weights assigned to each of the more than one performance metric are determined; and
the selected network interface group is the network interface group with the best performance according to a performance metric assigned with highest weight.

14. The method according to claim 1, wherein at least two network interfaces of all network interface groups connect to a same wireless access network via a same base station.

15. The method according to claim 1, wherein at least one network interface of the first network interface group and at least one network interface of a second interface group use, at least in part, the same radio spectrum.

16. The method according to claim 1, wherein the wireless access network operates in accordance with a standard selected from a group consisting of Ultra Wideband (UWB), and Worldwide Interoperability for Microwave Access (WiMAX), 3GPP standard, Long Term Evolution (LTE) standard, and 802.11x standard.

17. A system for sending and receiving information data at a network device, wherein the network device comprises:
at least one processing unit;
at least one main memory;
at least two network interlaces;
at least one secondary storage storing program instructions executable by the at least one processing unit for:
(a) sending testing data using a plurality of network interface groups to test servers;
(b) determining a performance data for a plurality of network interface groups according to at least one performance metric based on a performance report received from the test servers, wherein each of the plurality of network interface groups comprise at least one network interface, wherein the performance data is for selecting a first network interface group automatically;
(c) assigning weights to performance metrics when there are more than one performance metrics;
(d) calculating a weighted score of performance metrics based on weights assigned to each performance metric; wherein the weighted score is utilized for determining the performance data; wherein the performance data of a network interface group is a combination of performance data of each network interface belonging to the network interface group;
(e) storing data in a computer readable storage medium, wherein the data comprises the performance data, a list of network interface groups, and the testing data;

(f) selecting a first network interface group automatically for sending and receiving information data according to the performance data determined;

(g) when the performance data of the plurality of network interface groups are same or considered to be same, a network interface group with lowest number of common wireless channels is selected as the first network interface group;

(h) selecting at least one network interface of the first network interface group based on usage of wireless channels;

(i) when more than one network interface uses a wireless channel, selecting a first network interface of the more than one network interface and disabling the rest of the more than one network interface; wherein the first network interface is determined according to a predefined setting;

(j) when no wireless channel is used by more than one network interface, all network interfaces of the first network interface group are selected in step (h);

(k) sending and receiving information data via at least one of network interfaces of the first network interface group; and wherein at least one network interface of the plurality of network interfaces is capable of connecting to a wireless access network.

18. The system according to claim 17, wherein network interface(s) not belonging to the first network interface group are one of, functionally or electrically disabled after the first network interface group is selected.

19. The system according to claim 17, wherein the network interface(s) not belonging to the first network interface group is/are not used to send and receive information data after the first network interface group is selected.

20. The system according to claim 17, wherein when determining the performance data of one of the plurality of network interface groups, network interface(s) not belonging to the one of the plurality of network interface groups is/are disabled.

21. The system according to claim 17, wherein when determining the performance data of one of the plurality of network interface groups, network interface(s) not belonging to the one of the plurality of network interface groups is/are not used to send or receive information data.

22. The system according to claim 17, wherein when determining the performance data of one of the plurality of network interface groups, network interface(s) of the one of the network interface groups is/are used to send or receive testing data and network interface(s) not belonging to the one of the plurality of network interface groups is/are one of, functionally disabled, electrically disabled or not used to send or receive testing data, so that the network interface is not allowed to send or receive information data, and the network interface is allowed to draw power from the network device.

23. The system according to claim 17, wherein the at least one performance metric is based in part on at least one of a CPU usage metric, a memory usage metric, a response time metric, a packet delay metric, a packet latency metric, a bandwidth metric, a throughput metric, packet loss, packet drop, a power consumption metric, and a signal to noise ratio (SNR) metric.

24. The system according to claim 17, wherein the at least one performance metric is based in part on at least two of, a weighted CPU usage metric, a weighted memory usage metric, a weighted response time metric, a weighted delay metric, a weighted latency metric, a weighted bandwidth metric, a weighted throughput metric, weighted data loss, a weighted power consumption metric, and a weighted signal to noise ratio (SNR) metric.

25. The system according to claim 17, wherein the performance data determined is used to indicate the network interface group with the best performance; and the first network interface group is a network interface group with the best performance among the plurality of network interface groups.

26. The system according to claim 25, wherein when at least two performance data are within a predetermined range, the at least two performance data are considered to be the same.

27. The system according to claim 25, wherein when at least two network interface groups have the same performance data, the network interface group for sending and receiving information data is selected randomly.

28. The system according to claim 25, wherein when at least two network interface groups have the same performance data, the network interface group for sending and receiving information data is selected according to a predetermined setting.

29. The system according to claim 25, wherein when performance data is determined according to more than one performance metric:

performance data of each network interface group is used to indicate the network interface group with the best performance according to each of the more than one performance metric;

weights assigned to each of the more than one performance metric are determined; and the network interface group with the best performance according to the performance metric assigned with the highest weight, is selected.

30. The system according to claim 17, wherein at least two network interfaces of all network interface groups connect to a same wireless access network via a same base station.

31. The system according to claim 17, wherein at least one network interface of the first network interface group and at least one network interface of a second interface group use connect, at least in part, to the same radio spectrum.

32. The system according to claim 17, wherein the at least one wireless access network operates in accordance with a standard selected from a group consisting of Ultra Wideband (UWB), and Worldwide Interoperability for Microwave Access (WiMAX), 3GPP standard, Long Term Evolution (LTE) standard, and 802.11x standard.

* * * * *